Feb. 21, 1956  G. P. GRIEVE ET AL  2,735,964
VENTILATED HOUSING FOR RADIO APPARATUS AND THE LIKE
Filed April 5, 1952  2 Sheets-Sheet 1
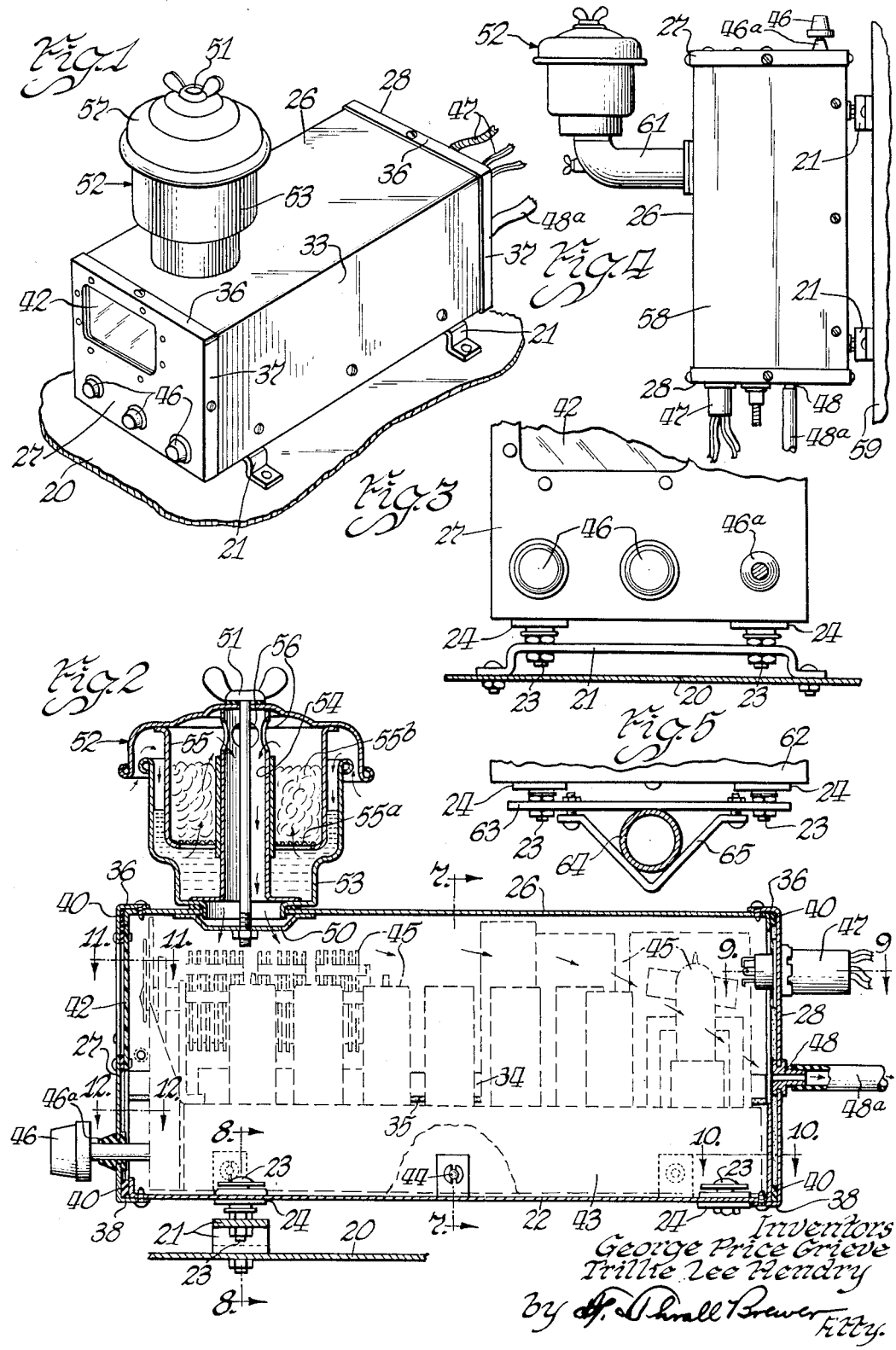

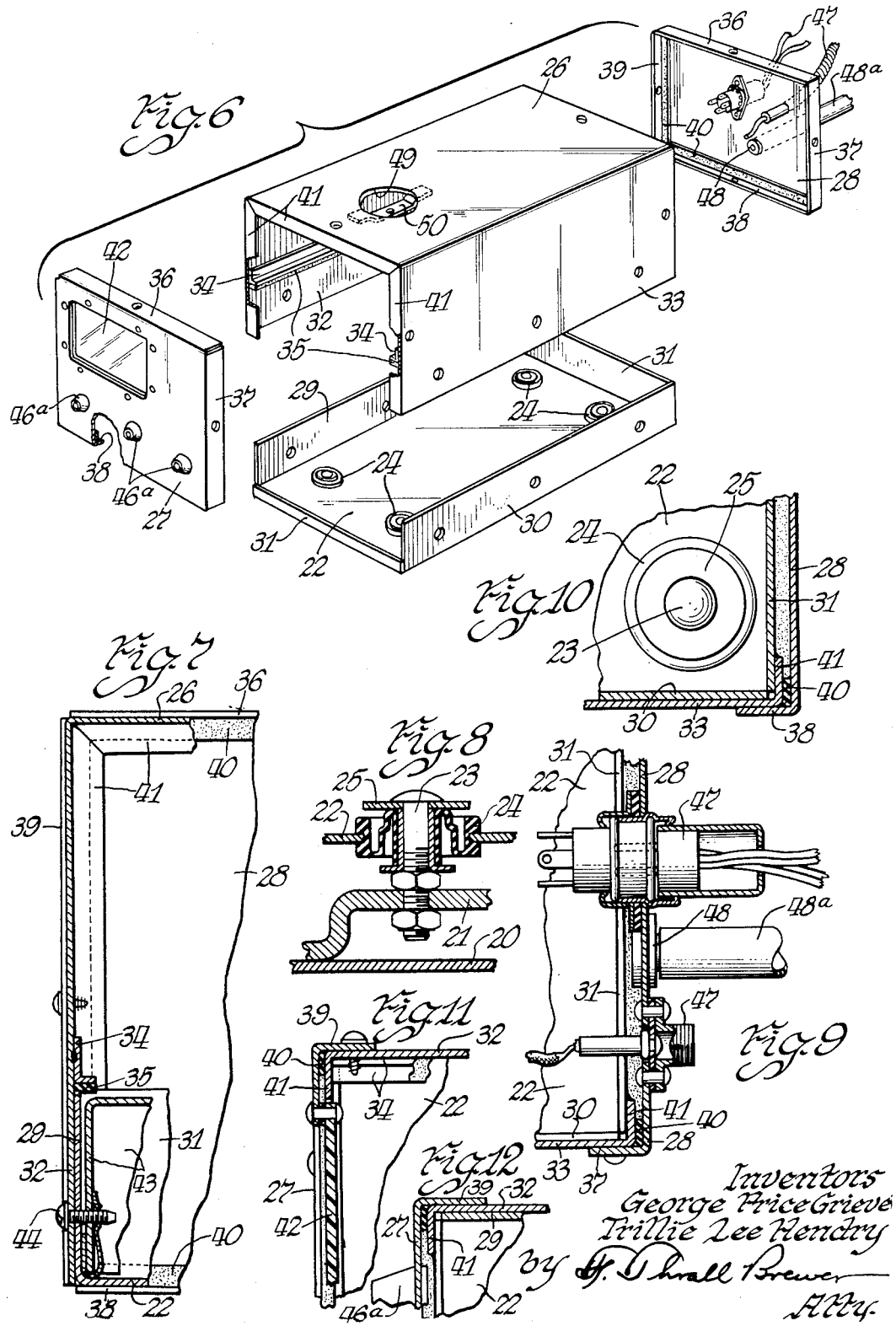

United States Patent Office 2,735,964
Patented Feb. 21, 1956

2,735,964

VENTILATED HOUSING FOR RADIO APPARATUS AND THE LIKE

George Price Grieve, Glenview, and Trillie Lee Hendry, Wood Dale, Ill.

Application April 5, 1952, Serial No. 282,732

2 Claims. (Cl. 317—101)

This invention relates to ventilated housings for radio apparatus and the like, and more particularly to such housings adapted to the protection of radio apparatus for operation under adverse conditions such, for example, as in places where the air contains appreciable quantities of dust and particles of material that would detrimentally affect the apparatus or its operation.

As a more general object, our invention has within its purview the provision of an enclosure for radio apparatus and the like which embodies seals for keeping out dust and dirt, and which has separable parts providing access to the enclosed apparatus.

Our invention further comprehends the provision of an enclosure of the type referred to which incorporates means for the dissipation of heat from the enclosed apparatus.

In the disclosed embodiment of our invention, we have also provided a tightly closed housing for radio apparatus and the like which embodies a rugged and shock resistant mounting adapting the housed apparatus to be mounted relative to various shapes of supporting parts and in different selected positions.

We have also provided, in our invention, a tightly closed housing having dust seals between the parts and means for affecting the forced flow of filtered cooling air through the housing.

In one adaptation, our disclosed enclosure and its appended features are well suited to use for housing and supporting a radio receiving set on a tractor or other machine utilized where dust and dirt are prevalent and where the set is otherwise exposed, so as to require protection in order to maintain satisfactory operation.

Other objects and advantages will be apparent also from the following description of an exemplary embodiment of our invention disclosed for illustrative purposes by reference to the accompanying two sheets of drawings, in which:

Fig. 1 is a perspective view of radio apparatus enclosed within a housing embodying preferred features of our invention, in one position relative to a supporting structure, such as a tractor;

Fig. 2 is a vertical sectional view of the apparatus and housing shown in Fig. 1, with exemplary radio apparatus depicted in dotted lines;

Fig. 3 is a fragmentary end view of the lower portion of the structure shown in Fig. 1;

Fig. 4 is a side elevational view of our enclosed radio apparatus modified to the extent necessary for mounting in a position different from that illustrated in Fig. 1;

Fig. 5 is a fragmentary end view showing a modified form of mounting structure for securing our enclosed radio apparatus in position on a supporting structure;

Fig. 6 is an exploded view showing the several parts of our preferred housing of the type shown in Fig. 1;

Figs. 7 and 8 are vertical sectional views taken substantially at the line 7—7 and the line 8—8, respectively, in Fig. 2; and Figs. 9, 10, 11 and 12 are horizontal sectional views taken substantially at lines 9—9, 10—10, 11—11 and 12—12, respectively, in Fig. 2.

Referring now to Figs. 1, 2 and 3 and Figs. 6 to 12, in which corresponding parts are designated by the same reference characters, 20 indicates supporting structure, such as a suitable portion of a tractor, in the form of a horizontal plate upon which our enclosed radio apparatus is mounted by supporting brackets 21 of a suitable shape and having resilient connections to a housing bottom or base member 22, as shown in Fig. 8. In the construction, as depicted, bolts 23 are securely mounted in the brackets 21 and are secured to the housing base 22 by resilient rubber mounting and shock absorbing devices 24 having movement limiting discs 25 mounted interiorly thereof for restricting the yielding movements of the housing base relative to the brackets and the bolts.

As shown in Fig. 6, the housing or casing for the radio apparatus includes the base 22, a top cover 26, and end caps 27 and 28, all made of sheet metal. The housing base 22 has upwardly extending flanges 29 and 30 along the sides thereof, and upwardly extending flanges 31 at its opposite ends. The top cover 26 includes downwardly extending side walls 32 and 33 along its opposite sides, each of said side walls being provided, along the full length of the mid-portion of the interior, with a longitudinally extending seal supporting strip which, in our disclosed structure, projects inwardly and is in the form of an angle bar 34 secured in position, as by spot welding. The base and cover members 22 and 26 are brought together with the flanges 29 and 30 of the base inside of the side walls so that the upper edges of the base flanges extend along the seal supporting strips 34. Cushioning and sealing strips 35 of a resilient material, such as sponge or foam rubber, are secured to the lower surfaces of the seal supporting strip, so as to be interposed between the angle bars 34 and the upper edges of the upwardly extending flanges, thereby providing a dust seal between the base and side walls.

Each of the end caps is provided with flanges 36, 37, 38 and 39 at right angles to the body portion thereof and arranged so as to fit over the opposite ends of the base and cover members 22 annd 26. A cushioning and sealing strip 40 of a resilient material, such as sponge or foam rubber, is mounted inside each of said flanges so as to abut end flanges 41 and 41a on the cover and base members, thereby to close the housing effectively. The end cap 27 is provided with a small glass or transparent plastic pane 42 which covers an opening in the end wall of the housing, as shown in Fig. 11, through which an indicator or dial may be viewed.

Within the housing bottom 22, a chaissis 43 of radio apparatus is secured, as shown in Figs. 2 and 7. This chassis 43, in the construction illustrated, is a metal plate having downwardly directed flanges along the ends and the sides, and secured to the housing bottom by screws 44 passing through the flanges of the chassis from the exterior of the housing. Operating parts 45 of the radio apparatus are mounted in any suitable manner upon the chassis 43, such operating parts being shown by dotted lines in Fig. 2 and being of any approved design. The controls for the radio apparatus comprise knobs 46 and their associated shafts mounted on the exterior of the housing end cap 27, and for which shaft seals are provided by resilient grommets fitting into openings in the housing and through which the control shafts extend. The external electrical connections for the radio apparatus are extended through one end wall 28 of the housing by suitable detachable connector parts 47 which provide a dust-tight seal for battery, speaker, and antenna leads or the like passing through the housing.

In the construction illustrated, the means for dissipating heat generated by the radio apparatus constitutes a means for effecting the flow of clean air through the housing, which is otherwise sealed against the passage of dust, dirt and the like. In the construction shown, a port or duct is provided by a nipple or fitting 48 which communicates with the air intake manifold of a tractor engine or other suitable means through a connecting conduit 48a to effect a forced flow of air outwardly through the duct. In order to provide the required inlet for the flow of clean cooling air to the housing, there is an air inlet opening 49 in the housing cover 26, as shown in Figs. 2 and 6. Below the opening 49, we have provided a cross strap 50 adapted to cooperate with a wing bolt 51 for holding an air cleaning device 52 of a suitable type in position.

The illustrated air cleaning device 52 includes a channel-type pan embodying an inner sleeve 54 and an outer pan 53 connected together at their lower ends so as to hold a quantity of oil or other suitable liquid, and having a second pan 55 encompassing the inner sleeve in spaced relationship to the outer pan, which second pan has openings therein below the normal level of the liquid in the outer pan. A screen 55a covers the openings at the lower end of the second pan 55, and a quantity of steel wool 55b or the like is provided in the second pan 55 and outside of the sleeve 54, which steel wool extends above the liquid level in the pans. Openings 56 for the passage of air are provided at the upper end portion of the sleeve 54, and a cap 57 is secured on the upper end of the sleeve to cover the pan 55, and is in spaced relationship to the open upper end of the outer pan 53. In this arrangement, as will be readily understood, air passes under the cap 57 and downwardly into the outer pan 53, thence through the liquid in the pans and then upwardly through the steel wool filter in the second pan. The air cleaned by passage through the liquid and filter flows through the openings 56 and downwardly through the sleeve 54 into the housing and thence around the operating parts of the radio apparatus.

The opening for the fitting 48 is at one end of the housing and radio apparatus, while the opening 49 for the entrance of cleaned air is near the opposite end of the housing and radio apparatus. The result is that a stream of cleaned air is fed through the housing and over the radio apparatus. This stream of air contacts the operating parts of the radio apparatus and serves, when the radio set is operating, to take away substantially all of the heat. At the same time, the housing provides effective protection against the entrance of dirt, even when the apparatus is to operate in dusty surroundings.

In the construction shown in Fig. 4, a modification is illustrated in which radio apparatus 58 is shown, secured to a portion 59 of a tractor or the like in an upright position, and having the air cleaning device 52 in upright position, at the side of the housing and supported through an elbow-type of air duct 61 opening into the upper end of the housing.

In the construction shown in Fig. 5, our enclosed radio apparatus 62 is mounted by a modified form of support comprising a bar 63 secured to the resilient mounting devices 24 and clamped to a bar or post 64 of a tractor or the like by a keeper bar 65 adapted to be tightened against said bar or post. The enclosed radio apparatus 58 and 62, including our improved protective means, has the same operation and the same advantages as have been described and need not be further described herein.

While we have illustrated a preferred embodiment of our invention, modifications thereof may be made without departing from the spirit of the invention, and we do not wish to be limited to the precise details of construction set forth, but desire to avail ourselves of all advantages within the scope of the appended claims.

Having thus described our invention, what we claim as new and desire to secure by Letters Patent of the United States is:

1. Dust-proof radio apparatus for use on tractors and the like and comprising, in combination, a chassis having radio parts mounted thereon and control shafts projecting from one end thereof, a housing having separable parts secured together to provide a substantially dust-proof enclosure for the chassis and radio parts, said housing including a base having side and end flanges extending upwardly from a bottom wall and of a size to receive the chassis therein, a cover having top and side walls of a size to fit over the base with the side walls overlapping the side flanges of the base, said side and top walls of the cover each having inwardly extending end flanges in substantially flush relationship to the end flanges on the bottom wall when the cover is in place on the base, said side walls also having inwardly projecting angle strips secured to the opposed inner surfaces thereof and carrying resilient sealing strips which engage the edges of the side flanges of the base to provide dust seals, and end caps having flanges thereon which fit over the top and side walls of the cover and the bottom wall of the base and having within the flanges resilient strips which engage and form dust seals with the end flanges of the cover and base, one of said end caps having openings therein through which the control shafts extend and having sealing washers providing dust seals with each of said shafts.

2. Dust-proof radio apparatus as defined in claim 1, and further characterized by mounting means secured to the bottom wall of the base and including resilient grommets having relatively heavy peripheral portions secured in spaced openings in the base, said grommets having flexible midportions with metal sleeves extending therethrough for connection to supporting structure and terminating in spaced relationship to opposite ends of the grommets, and metal flange means extending radially from opposite ends of the sleeves to overlie the peripheral portions of the grommets so as to limit axial movements of the sleeves relative to the peripheral portions of the grommets.

References Cited in the file of this patent

UNITED STATES PATENTS

| | | |
|---|---|---|
| 1,954,645 | Perkins | Apr. 10, 1934 |
| 1,968,557 | Johanson | July 31, 1934 |
| 2,053,941 | Booth | Sept. 8, 1936 |
| 2,149,516 | Flamm | Mar. 7, 1939 |
| 2,175,025 | Hooven | Oct. 3, 1939 |
| 2,187,011 | Braden | Jan. 16, 1940 |
| 2,215,200 | Usselman | Sept. 17, 1940 |
| 2,344,441 | Larenz | Mar. 14, 1944 |
| 2,526,901 | Robbins | Oct. 24, 1950 |